United States Patent [19]
Hess et al.

[11] Patent Number: 6,098,592
[45] Date of Patent: Aug. 8, 2000

[54] PROCESS AND DEVICE FOR CONTROLLING AN INTERNAL COMBUSTION ENGINE

[75] Inventors: Werner Hess, Stuttgart; Hong Zhang, Regensburg, both of Germany

[73] Assignee: Robert Bosch GmbH, Stuttgart, Germany

[21] Appl. No.: 09/051,340

[22] PCT Filed: Jul. 24, 1996

[86] PCT No.: PCT/DE96/01354

§ 371 Date: Apr. 6, 1998

§ 102(e) Date: Apr. 6, 1998

[87] PCT Pub. No.: WO97/13973

PCT Pub. Date: Apr. 17, 1997

[30] Foreign Application Priority Data

Oct. 7, 1995 [DE] Germany ............ 195 37 440
May 14, 1996 [DE] Germany ............ 196 19 320

[51] Int. Cl.$^7$ ............... F02D 17/02; F02D 43/00
[52] U.S. Cl. ............ 123/350; 123/406.19; 123/198 F
[58] Field of Search ............... 123/329, 332, 123/333, 339.11, 350, 351, 406.19, 481, 198 F

[56] References Cited

U.S. PATENT DOCUMENTS

| | | | |
|---|---|---|---|
| 5,459,662 | 10/1995 | Tezuka et al. | 123/333 |
| 5,479,898 | 1/1996 | Cullen et al. | 123/350 |
| 5,692,471 | 12/1997 | Zhang | 123/350 |
| 5,769,054 | 6/1998 | Schnaibel et al. | 123/406.47 |

FOREIGN PATENT DOCUMENTS

5-164225  6/1993  Japan.

*Primary Examiner*—Andrew M. Dolinar
*Attorney, Agent, or Firm*—Walter Ottesen

[57] ABSTRACT

A method and an arrangement for controlling an internal combustion engine are suggested wherein a pregiven number of cylinders are shut off for reducing consumption and for reducing toxic substances in predetermined operating conditions. To maintain the torque desired by the driver, a correction of the ignition angle and/or a control of the cylinders to be suppressed is undertaken especially in the transition phase to cylinder shutoff and when switching on the cylinders. This is in addition to a corresponding influencing of the charge.

9 Claims, 9 Drawing Sheets

FIG. 9

PROCESS AND DEVICE FOR CONTROLLING AN INTERNAL COMBUSTION ENGINE

FIELD OF THE INVENTION

The invention relates to a method and an arrangement for controlling an internal combustion engine.

BACKGROUND OF THE INVENTION

EP 27 865 A1 discloses switching out and switching in at least one cylinder of a multi-cylinder internal combustion engine in pregiven operating states of the vehicle or the engine (that is, interrupting the metering of fuel to the cylinder and resuming the metering of fuel). In this known arrangement, the position of an electrically actuable throttle flap is shifted abruptly to compensate the torque change, which is generated because of switching the cylinder out, in order to maintain the torque essentially constant which is outputted by the engine. In this known arrangement, the switching in and switching out of the cylinders can be perceived by the driver notwithstanding the change of the throttle flap position as a consequence of the slowness of the air intervention inherent to the system.

SUMMARY OF THE INVENTION

It is an object of the invention to configure the transition into an operation with cylinder switchoff and vice versa in such a manner that the driving comfort is not affected and that the engine torque, which is outputted by the engine, is maintained essentially constant even in the transition.

A method and an arrangement for controlling an internal combustion engine is known from U.S. Pat. Nos. 5,556,178 and 5,657,238 wherein a unified engine torque interface is utilized. A torque command, which is supplied via this torque interface, is realized via slowly changing interventions (charge) and/or rapid interventions (injection suppression and ignition angle). No measures are provided in connection with the switching off of a pregiven number of cylinders, preferably the switching off of a cylinder bank, in the idle range and in the part-load range.

DE 43 34 864 A1 discloses a control method and a control arrangement for an internal combustion engine wherein the abrupt torque change is reduced when switching on and switching off a cylinder via suitable synchronization of ignition angle correction and injection suppression.

When switching off and switching on at least one cylinder of a multi-cylinder engine in the part-load range, the torque, which is outputted by the engine, is maintained essentially constant for unchanged pedal position and engine rpm via the coordination of the ignition intervention, charge intervention and injection intervention. The driving comfort is therefore not affected by switching on and switching off the cylinders.

The application of this procedure in combination with the switching on and switching off of cylinder banks in engines having a large number of cylinders is especially advantageous.

It is especially advantageous that the driver command (the torque wanted by the driver) is realized independently of the switching on or switching off of individual cylinders. Here, no perceptible comfort deteriorations occur during the dynamic operation.

It is especially advantageous that external interventions on the engine (for example from a drive slip control or a transmission control) can be realized likewise independently of the switching in and switching off.

BRIEF DESCRIPTION OF THE DRAWINGS

The invention is explained in greater detail with respect to the embodiments shown in the drawing. Here.

DESCRIPTION OF THE PREFERRED EMBODIMENTS OF THE INVENTION

Figure 1:
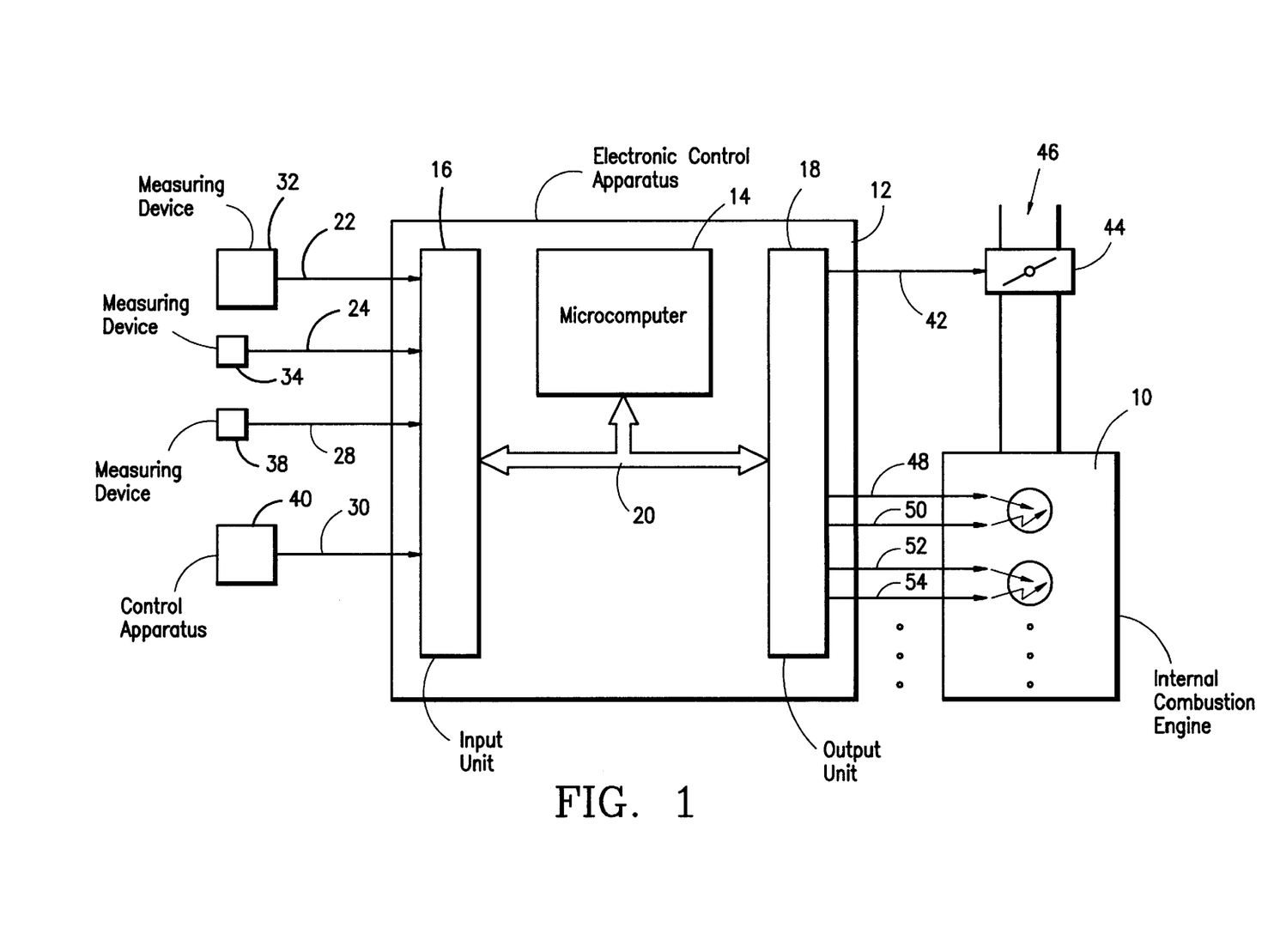
FIG. 1 shows an overview block circuit diagram of a control arrangement for an internal combustion engine; whereas, in FIG. 2, an overview block circuit diagram of the procedure of the invention is shown. In the block circuit diagrams of FIGS. 3 to 9, different embodiments of the procedure provided by the invention are described.

In FIG. 1, a control apparatus for a multi-cylinder internal combustion engine 10 is shown. The control arrangement includes an electronic control apparatus 12 which comprises at least one microcomputer 14, an input unit 16 and an output unit 18. Input unit 16, output unit 18 and microcomputer 14 are logically coupled to each other via a communication bus 20 for mutual data exchange. Input lines 22, 24, 28 and 30 are supplied to the input unit 16. The line 22 originates from a measuring device 32 for detecting the pedal position and the line 24 originates from a measuring device 34 for detecting the engine rpm. The line 28 originates from a measuring device 38 for detecting the engine load and the line 30 originates from at least one further control apparatus 40, for example, a control apparatus for drive slip control, transmission control and/or for engine drag torque control. Depending upon the embodiment, air mass sensors, air quantity sensors or pressure sensors for detecting the intake pipe pressure or the combustion chamber pressure are provided for detecting the engine load. In addition to the above operating variables, the control unit detects further variables which are essential for engine control such as the engine temperature, road speed, et cetera.

An output line 42 is connected to the output unit 18 which leads to an electrically actuable throttle flap 44 which is arranged in the air induction system 46 of the engine. In addition, output lines 48, 50, 52, 54, et cetera are shown which are connected to actuating devices for fuel metering in each cylinder of the engine 10 or for adjusting the ignition angle in each cylinder.

The basic idea of the procedure of the invention is the realization of the engine torque by coordination of charge, ignition angle adjustment and injection suppression when switching off or switching on a number of cylinders which is pregiven for reducing consumption and toxic substances, for example, when the engine is driven in a predetermined (part) load range. The decision as to the cylinder suppression or cylinder resumption and the extent thereof is made in the preferred embodiment on the basis of engine load and engine rpm. If the measured engine load and the measured rpm drop below a predetermined limit value, then a pregiven number of cylinders is switched off. When the limit value is exceeded, the cylinders are again switched on, that is, fuel is again metered. According to the present invention, and starting from the driver command, the engine torque pregiven by the driver, engine load, charge or power is essentially maintained at the value pregiven by the driver in accordance with the pregiven number of cylinders by intervention in the ignition angle and in the charge in steady-state operation as well as in transitions.

Figure 2:
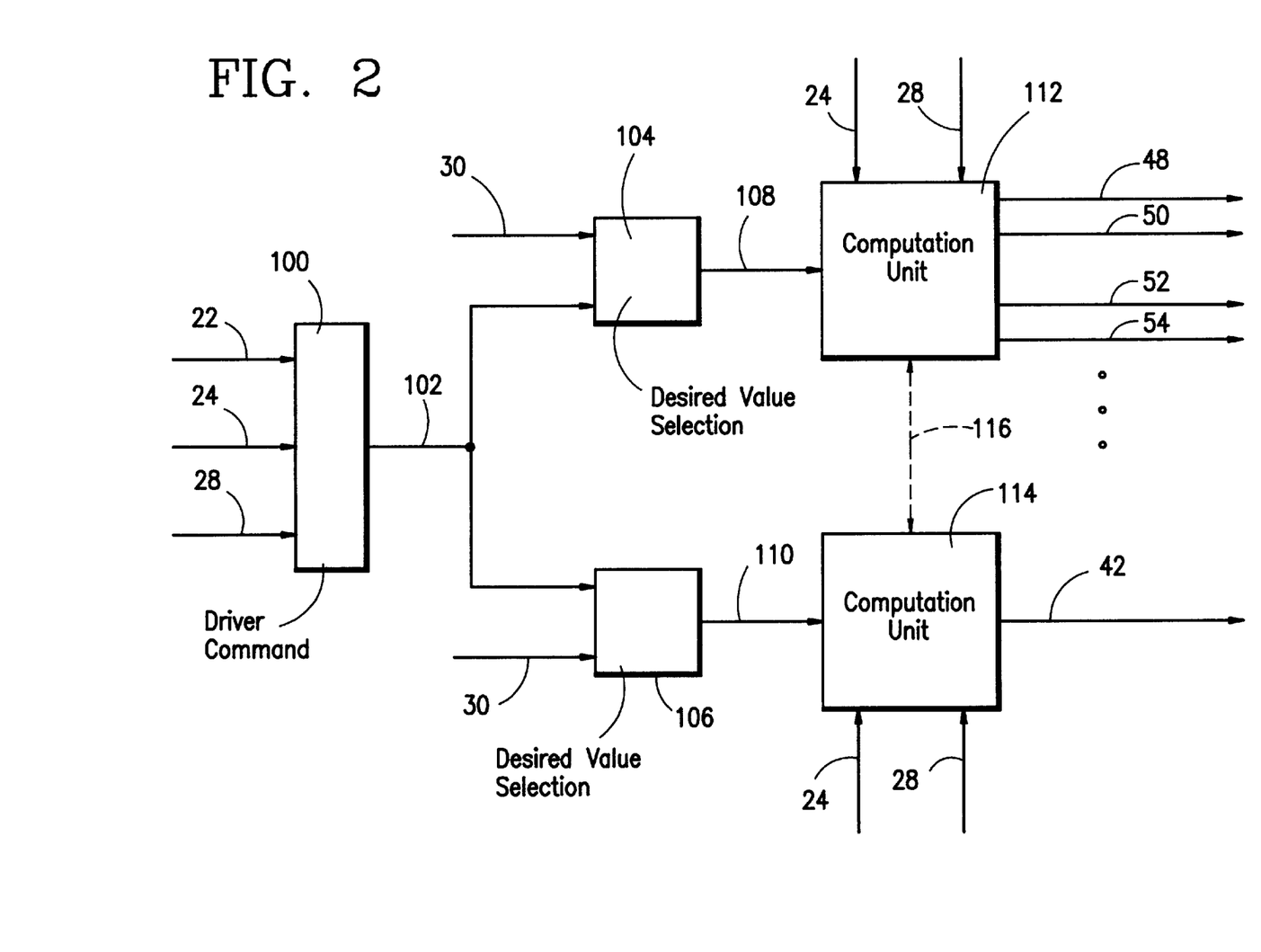

In FIG. 2, the basic structure of the engine control in the context of the solution of the invention is shown with the aid of a block circuit diagram. The elements shown in the block circuit diagrams are, in a preferred realization, parts of the program of the microcomputer. The blocks represent special subprograms with tables, characteristic lines, characteristic fields and/or computation steps.

The input lines 22, 24 and 28 lead to an element 100 for determining the driver command. The driver command is determined in the manner described below (see FIG. 3 or 4). The driver command is conducted via a line 102 to elements 104 and 106 and the line 30 leads to each of blocks 104 and 106. The elements 104 and 106 serve to select the desired value which is to be pregiven for the engine control in accordance with the supplied desired quantities with reference to driver command as well as external interventions (see FIG. 5). The selected desired value is supplied via line 108 to computation unit 112 and via line 110 to computation unit 114. The computation unit 112 computes the correction of the ignition angle and/or the injection suppression (see FIG. 8 or 9) in accordance with at least engine rpm and engine load. In the same manner, the computation unit 114 computes the charge from the supplied desired value in accordance with at least engine rpm and engine load. The charge is adjusted by driving the throttle flap via the line 42 (see FIG. 6 or 7). In a preferred embodiment, the computation units 112 and 114 are connected via line 116 to exchange data.

To reduce consumption and improve toxic emissions, the control unit predetermines the number of cylinders to be switched off or to be resumed (reduced stage) in dependence upon engine operating state (engine load, engine rpm). Via the procedure shown in FIG. 2 and, in addition to the cylinder switchoff, further interventions on the torque of the engine (intervention from a drive slip control, from a transmission control, from the driver) are coordinated by adjusting the charge (slow intervention), injection and ignition angle (rapid intervention).

For adjusting the air charge, the pregiven cylinder switchoff and the steady-state ignition angle are considered without additional intervention in the context of the computing unit 114 so that, for constant pedal position (in the steady-state case), the torque, which is outputted by the engine, remains constant independently of whether a cylinder switchoff is present or not. The ignition angle is corrected and/or individual injections are suppressed during the dynamic operation when realizing the pregiven cylinder switchoff or when ending the cylinder switchoff so that the torque outputted by the engine remains essentially constant (computation unit 112) even during this dynamic operation (at constant pedal position). In the preferred embodiment, ignition angle intervention and injection intervention are synchronized in accordance with the state of the art referred to initially herein.

Several paths are open to determine the desired value pregiven by the driver. It is known to specify a desired clutch torque from the accelerator pedal angle. This torque is computed from the wheel torque while considering the state of the transmission (gear stage, converter state, transmission loss). The wheel torque is computed in dependence upon the accelerator pedal position and the road speed.

Figure 3:
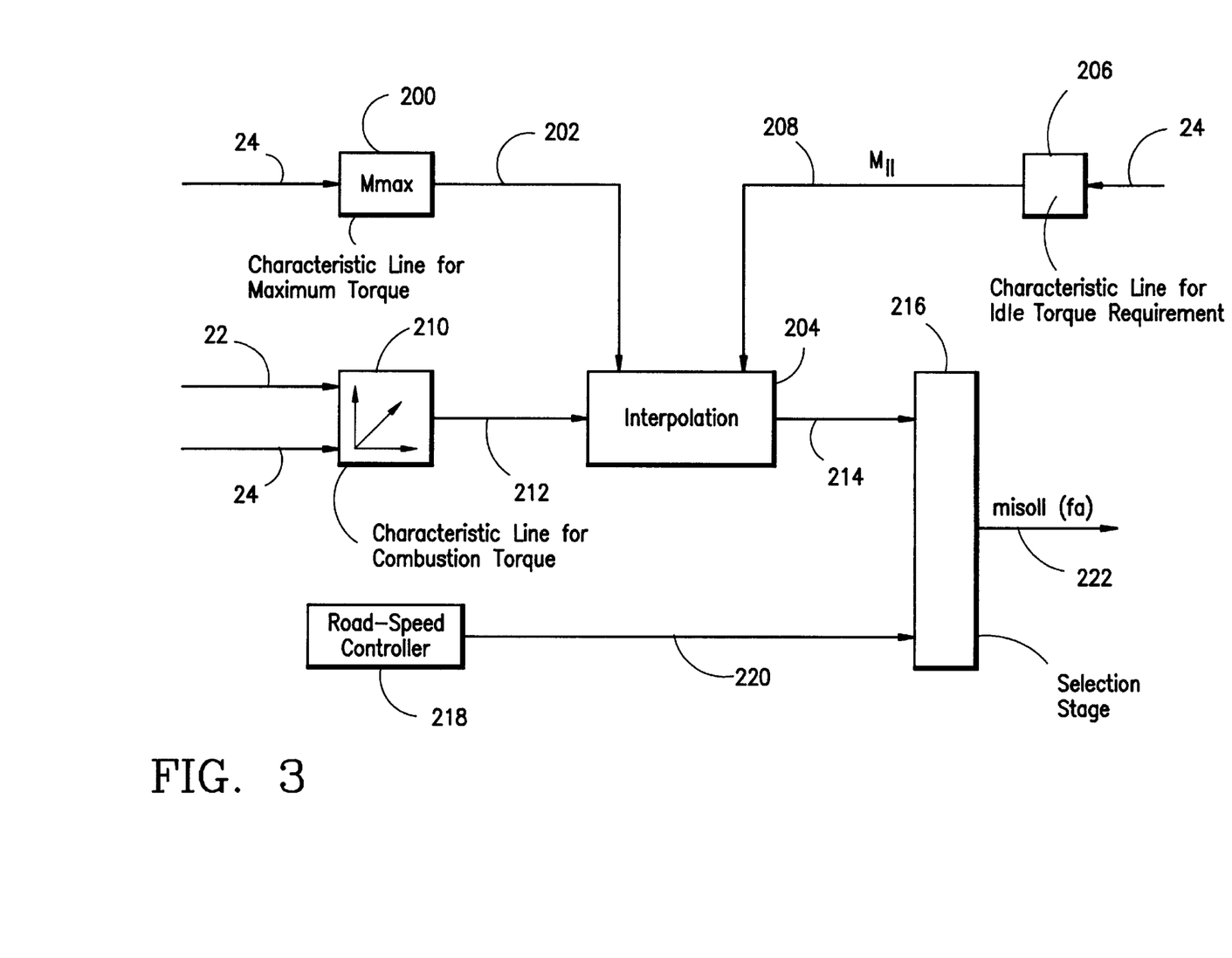

Another possibility for computing the driver desired value is shown in FIG. 3. There, a desired combustion torque MISOLL(FA), which is pregiven by the driver, is computed directly from the accelerator pedal position via interpolation between the torque requirement at idle MLL and the maximum torque MMAX.

This embodiment of block 100 is shown in FIG. 3. Here, the maximum torque value and the torque requirement in idle (pedal not depressed) MLL is pregiven as an rpm-dependent characteristic line. In another advantageous embodiment, the torque requirement at idle (pedal not depressed) MLL defines the output (rpm dependent) of an idle rpm controller. In the embodiment shown in FIG. 3, the engine rpm is supplied via the line 24 to the stored characteristic line for the maximum torque 200. From this characteristic line, a maximum torque value is read out and is supplied via the line 202 to the interpolation block 204. Correspondingly, the engine rpm is supplied via the line 24 to the stored characteristic line 206 for the idle torque requirement. A value, which represents the idle requirement value MLL, is read out of the characteristic line 206 and is supplied via the line 208 to the interpolation block 204. Furthermore, a preprogrammed characteristic field 210 is provided to which the engine rpm is supplied via line 24 and to which the accelerator pedal position is supplied via line 22. In dependence upon these two quantities, a combustion torque, which corresponds to the accelerator pedal position, is determined in the characteristic field between a maximum value and a minimum value and is conducted via the line 212 to the interpolation block 204. In the interpolation block 204, the desired value is computed in the context of a linear interpolation between maximum value (MMAX) and a minimum value (MLL) and the corresponding driver desired torque value is supplied via the line 214 to a selection stage 216. In this selection stage 216, the larger of the desired torque values, which is pregiven because of the accelerator pedal actuation, and a corresponding desired torque value, which is supplied from the road-speed controller 218 via the line 220 to the selection stage 216, is selected as the driver desired torque value MIDES(FA) and is outputted via the line 220. The desired torque value, which is pregiven by the road speed controller, is computed on the basis of the desired road speed, which is pregiven by the driver via an operator-controlled element. This computation is made considering the transmission gear ratio, transmission losses and the torque losses of the engine. The characteristic lines 200 and 206 are pregiven in such a manner that the idle required value becomes less with increasing rpm and drops to zero, as may be required.

Figure 4:
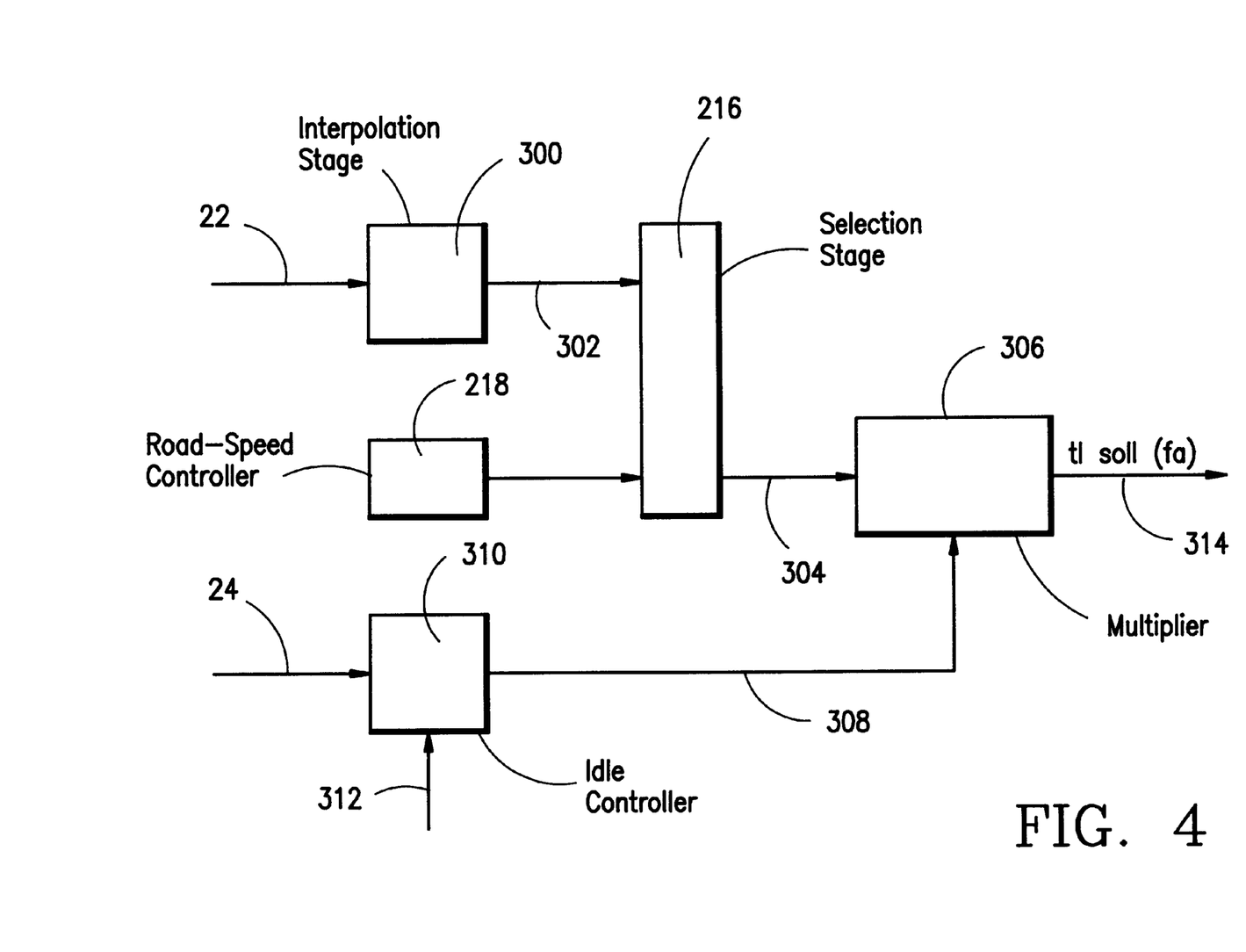

A further advantageous embodiment for determining the driver command is shown in FIG. 4. In this embodiment, a desired charge value (desired load) is determined in lieu of the desired torque. The accelerator pedal position value is supplied via the line 42 to an interpolation stage 300 wherein the relative desired charge value is determined by interpolation between a minimum charge value and a maximum charge value. This value is transmitted via line 302 to the selection stage 216. There, the larger of the correspondingly treated desired value signals of road-speed controller 218 and the relative charge value from the accelerator pedal position is selected as the driver command value. The selected desired value signal is conducted via line 304 to a multiplier block 306. The line 308 leads to the multiplier block 306 from an idle controller 310. The idle controller 310 determines the relative charge in idle on the basis of the engine rpm as well as the cylinder switchoff condition supplied via the line 312. The relative charge value, which is determined by the idle controller, is divided for correction by the ratio of the maximum number of cylinders to the number of cylinders switched off in correspondence to the number of switched off cylinders. Thereafter, in block 306, a percentage portion of the maximum charge is determined as a corrective value and multiplied by the driver charge value to determine the desired charge value which goes beyond the idle value. This percentage portion of the maximum charge is derived from the charge value of the idle controller. The result, the charge desired value TLSOLL(FA) is outputted via the line 314.

In addition to the determination of charge desired values or torque desired values, a load desired value (corresponds to charge value), a power desired value (computation from desired torque and rpm) et cetera are determined in other advantageous embodiments.

Block 106 is disposed in the path of the charge adjustment. In this block 106, the coordination of the driver desired values takes place, which are determined in FIGS. 3 and 4, to desired values which originate from additional interventions. According to FIG. 5, the lines 314 and 222 lead to a first selection stage 400 wherein the smallest of the supplied desired values is selected. Accordingly, in selection stage 400, interventions are joined which can lead to a reduction of engine torque relative to the driver command. Functions of this kind are, for example, a drive slip control, a transmission control or functions such as load limiting, speed limiting, rpm limiting and/or torque limiting. The corresponding desired values are supplied to the element 400 in the particular dimension applied (charge, torque, et cetera). The block 406 exemplifies an additional intervention supplied to the first selection stage 400 via line 408 by one of the above functions.

Figure 5:
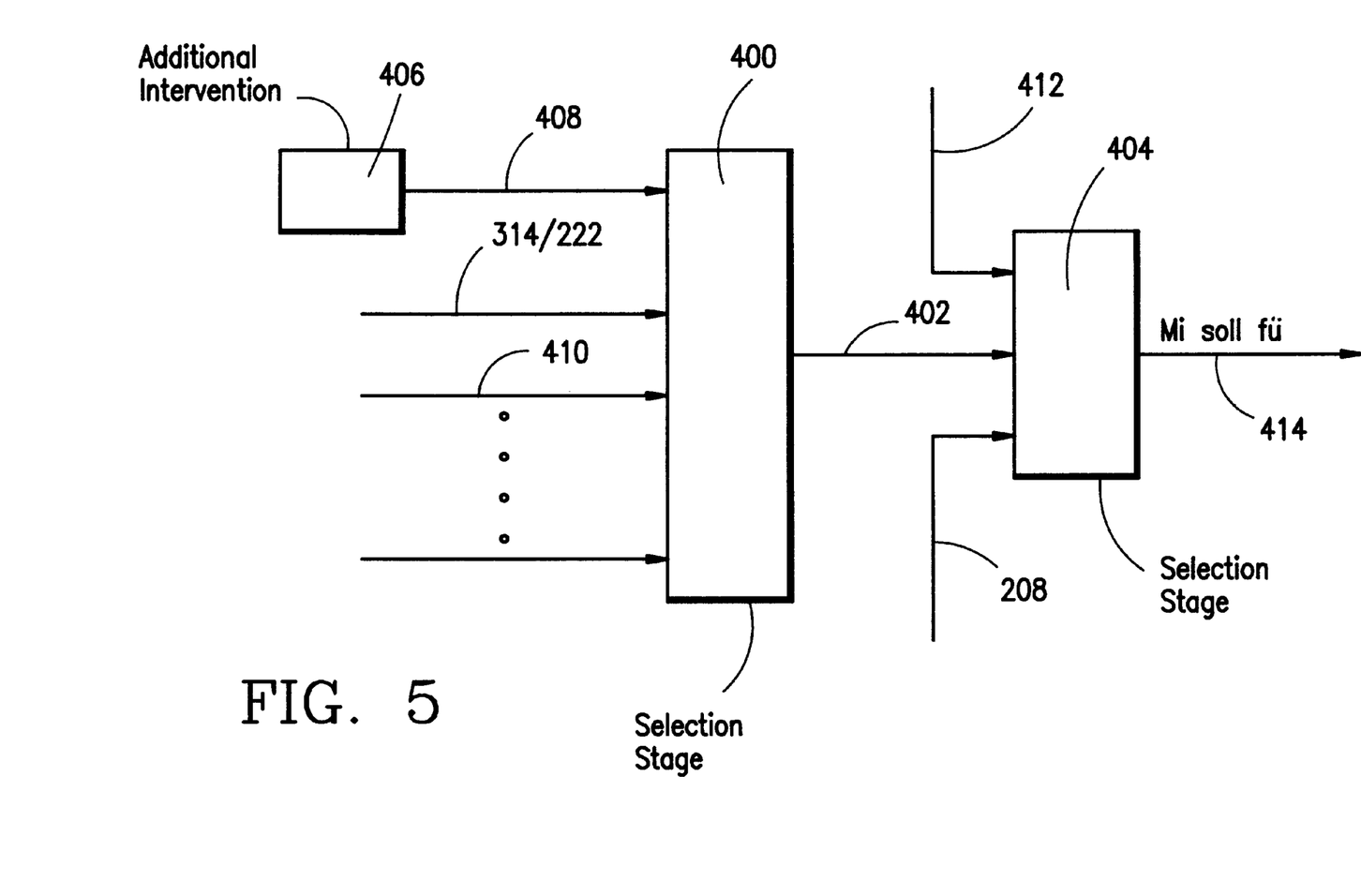

The particular desired value selected is supplied via the line 402 to a further selection stage 404. This selection stage transmits the particular larger value further so that interventions, which increase the engine torque relative to the driver command, are considered by the selection stage 404. Interventions of this kind originate from the idle control or from an engine drag torque control. The corresponding desired values are supplied via the lines 208 and 412. A desired torque value for adjusting the charge MISOLLFÜ or a desired charge value TLSOLL is outputted via output line 414 to the computation block 114.

The corresponding procedure is carried out with respect to the fuel and ignition angle intervention in block 104 (output quantity desired combustion torque MIDES or desired load value TLSOLL). Only interventions are considered which also or only act upon fuel metering and/or ignition such as drive slip control, idle control, et cetera.

Figure 6:
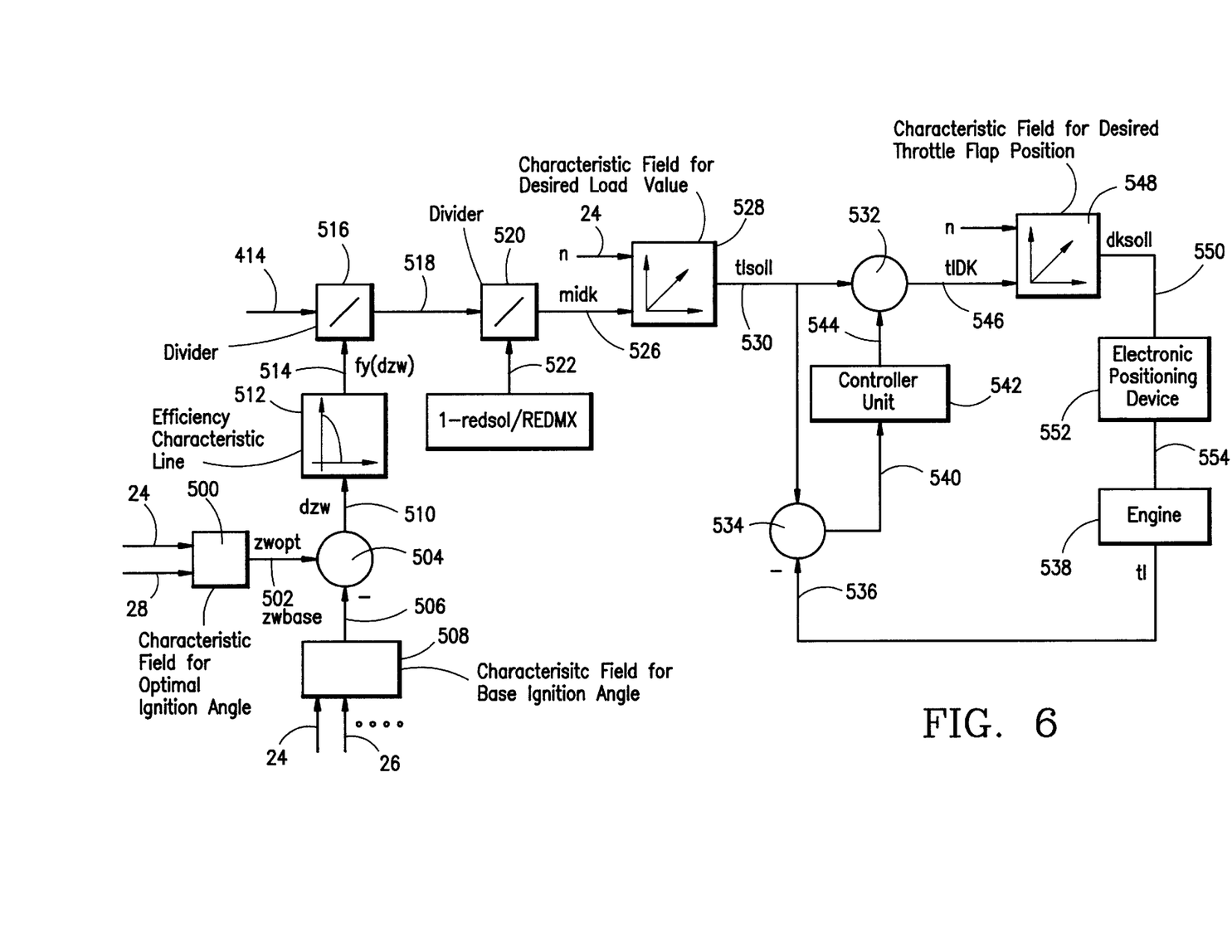

In FIG. 6, the operation of the computation block 114 is shown with respect to a preferred embodiment. Here, the throttle flap opening is computed while considering the pregiven cylinder switchoff. In order to realize the desired combustion torque, which is determined in accordance with FIG. 5 and transmitted via the line 414, the charge (that is, the throttle flap adjustment) must be corrected for cylinder switchoff. While considering the influence of the ignition angle (without intervention ZWBASE and the cylinder switchoff having a pregiven reduction stage REDSOL), an indicated engine torque MIDK results for the computation of the throttle flap opening in accordance with the following equation:

MIDK=MISOLLFÜ/(f(ZWOPT−ZWBASE)×(1−REDSOL/REDMX) wherein: ZWOPT is the optimal ignition angle, ZWBASE is the base ignition angle without intervention, f( ) is the efficiency characteristic line, which is dependent on the difference between the optimal ignition angle and the base ignition angle referred to the optimal torque MIOPT; REDSOL is the pregiven reduction stage and REDMX is the maximum number of stages.

If half of the cylinders is switched off, then REDSOL= REDMX/2 so that the indicated engine torque MIDK is increased approximately by the factor of 2.

The computation of MISOLLFÜ according to the above equation is shown in FIG. 6. In a characteristic field 500, the optimal ignition angle ZWOPT is determined in accordance with the engine rpm and the engine load, which are supplied via lines 24 and 26, respectively. This ignition angle or the characteristic field 500 is determined with reference to an optimal efficiency of the engine. The optimal ignition angle is conducted to a comparator stage 504 via the line 502. The base ignition angle without intervention is supplied to the comparator stage 504 via the line 506 for forming the difference DZW. The base ignition angle without intervention is formed in characteristic field 508 in dependence upon engine rpm, engine load, engine temperature, et cetera. This ignition angle defines that ignition angle which would be adjusted under actual operating conditions without external intervention, without cylinder switchoff and without ignition angle correction. The difference DZW is supplied from the comparator element 504 via the line 510 of the efficiency characteristic line 512. The output line 514 of this characteristic line leads to a dividing element 516. The output signal of the efficiency characteristic line 512 defines a corrective value of the desired value MISOLLFÜ, which is formed under optimal efficiency. This corrective value results from the deviation of the adjusted ignition angle without intervention from the optimal ignition angle, which is determined to adjust the optimal efficiency of the engine. The correction takes place in correspondence to the above equation in the dividing element 516. The result is supplied via line 518 to the dividing element 520. There, a factor is supplied via line 522 from the cylinder switchoff input unit 524. This factor represents the number of switched off cylinders. The result MIDK of element 520 is supplied via the line 526 to the characteristic field 528 wherein a desired load value TLSOLL is read out via the line 530 from the desired engine torque MIDK for computing the throttle flap opening in accordance with the engine rpm. This desired value is, on the one hand, conducted to a multiplier stage 532 and, on the other hand, to a comparator element 534. The comparator element 534 is supplied with a measure for the actual load of the engine 538 via the line 536. The actual load is measured via the following: an air mass sensor, an air quantity sensor, an intake pipe pressure sensor or a combustion chamber pressure sensor. The difference between the desired and actual loads is conducted via the line 540 to the controller unit 542. The controller unit 542 determines a corrective value for the load desired value from the control deviation in accordance with a pregiven control strategy (for example, PID). In the multiplier stage 532, desired value and corrective value are multiplied and conducted via an output line 546 to a further characteristic field 548. There, a desired throttle flap position value DKSOLL is determined in accordance with the rpm from the pregiven corrected desired load value. This desired throttle flap position value DKSOLL is conducted via line 550 to the electric positioning device 552. This device 552, for example, adjusts the throttle flap of the engine via line 554 and thereby the charge or the combustion torque via a charge adjustment to the pregiven desired value. The quantity of fuel to be injected is determined, as known, at least from engine rpm and load with a view to a pregiven air/fuel ratio.

The procedure of FIG. 6 therefore forms the desired charge TLSOLL and ultimately the throttle flap desired position DKSOLL from the desired torque MIDK and the rpm via the characteristic field 528 which was measured at optimal ignition angle. The input of the cylinders (block 524) to be switched off takes place in the preferred embodiment at idle and at low load, for example, when the desired torque by the driver is less than a pregiven threshold. The switchoff of the cylinders takes place also in overrun operation. The desired torque for the charge increases with increased accelerator pedal position. If the accelerator pedal position becomes so great that, for example, the computed throttle flap opening DKSOLL exceeds a pregiven rpm-dependent threshold (for example 85°), then, in the preferred embodiment, the cylinder switchoff is cancelled. In this case, the desired torque MIDK is reduced approximately by half. The switchoff input is again activated when the system is again in idle or at low load or in the overrun phase.

The realization shown in FIG. 6 applies only to the steady-state case, that is, for the case wherein the cylinders are already switched off. During the switchoff or during the switchon of the cylinders, the interventions into the charge, the cylinders and the ignition angle must be so synchronized that the least possible change is noticeable on the torque, which is outputted by the engine, before and after cylinder switchoff. If a pregiven number of cylinders is switched off, the torque MIDK is computed from the above-mentioned equation with the new number of switched-off cylinders REDSOL. The then determined throttle flap opening can be adjusted immediately (abruptly) or, in the preferred embodiment, with a pregiven time ramp. In this way, the measured load TL increases. This behavior is utilized for ignition angle correction as described below with respect to FIG. 8.

Figure 7:
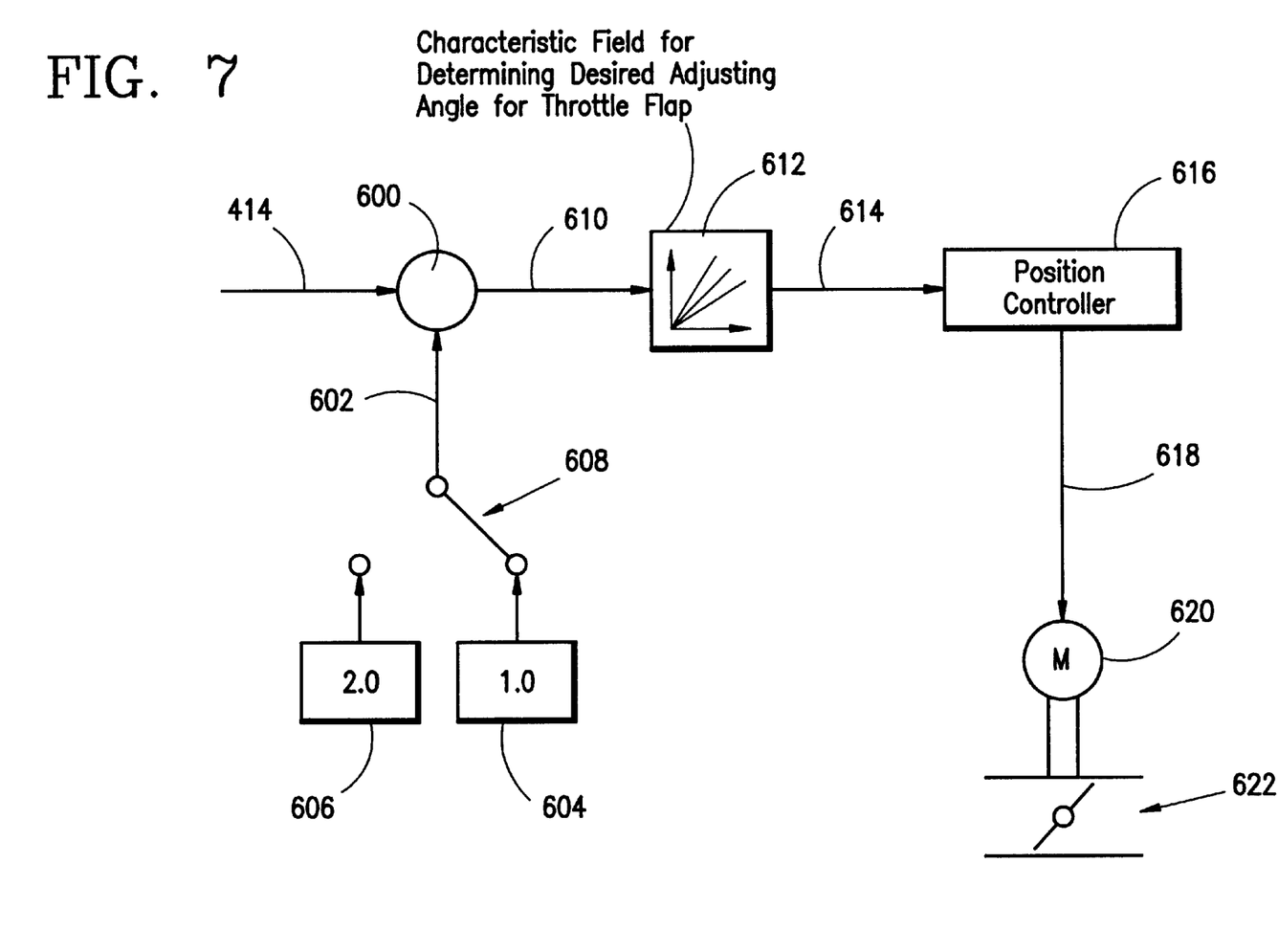

A second embodiment for adjusting the charge in accordance with the pregiven desired value is shown in FIG. 7. This embodiment is preferably to be applied when the desired value is a charge value.

The desired value is supplied via the line 414. In the follow-on multiplier position 600, the supplied desired value is multiplied by factors, which are supplied via the line 602, and which represent the number of switched-off cylinders. If all cylinders are active, then the factor 1 is read out of the memory position 406. If half of the cylinders is switched off, the value 2 is read out from the memory cell 606 while switching the switching element 608. Correspondingly, factors can be provided for additional numbers of cylinders to be switched off. The corrected desired value is conducted via the line 610 to a characteristic field 612 wherein, if required, a desired adjusting angle for the throttle flap is determined while considering the engine rpm. This desired adjusting angle is outputted via the line 614 to the position controller 616 which adjusts the throttle flap 622 in correspondence to the desired value via the drive line 618 and the motor 620.

In a simplified version of the procedure of FIG. 6, the procedure shown in FIG. 7 can be applied also when inputting a desired torque value.

Figure 8:
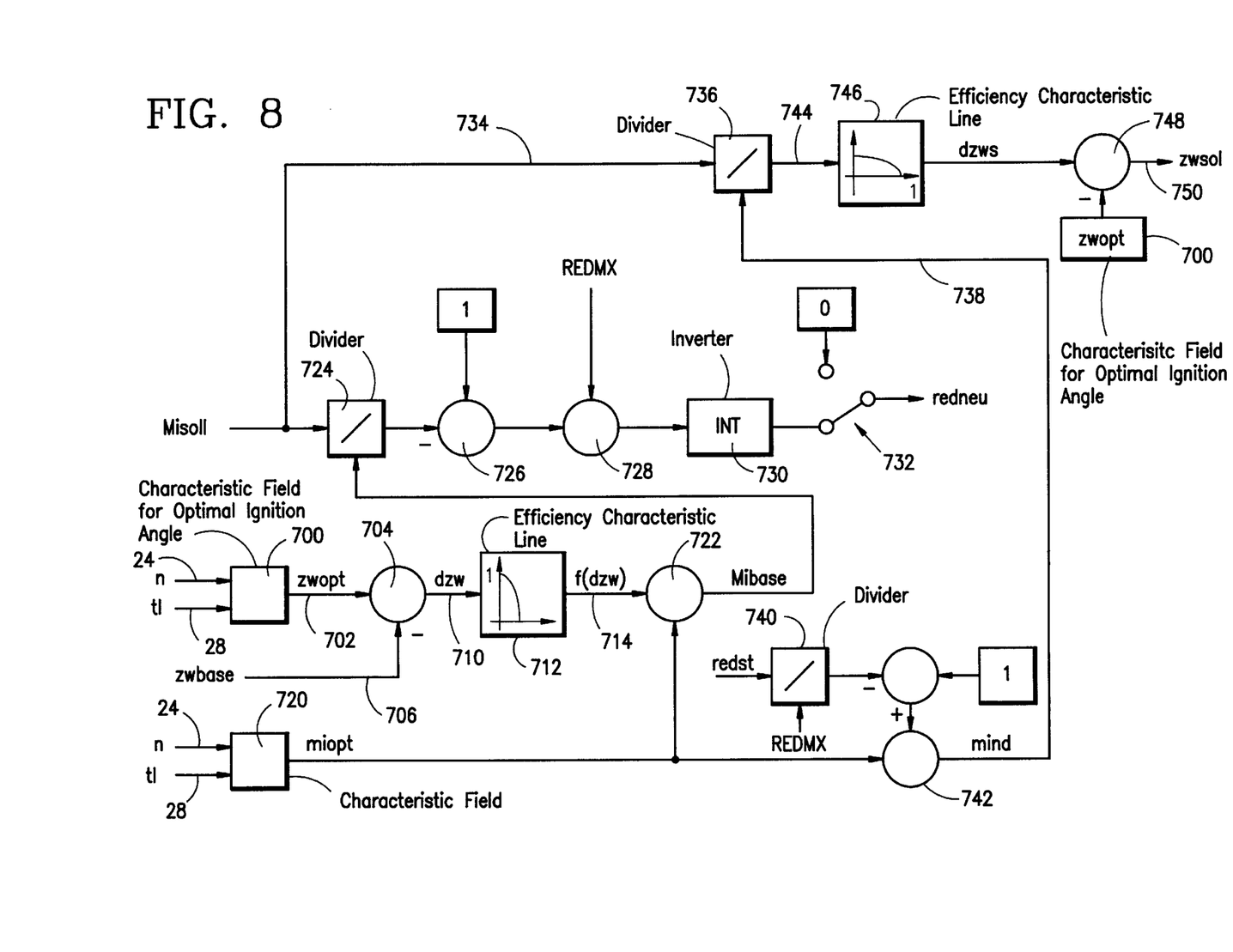

FIG. 8 shows a preferred embodiment for controlling the ignition angle and the metering of fuel, especially in the dynamic range, for supplementing the adjustment of the charge shown in FIG. 6 or 7.

When switching off or switching on the cylinders, the throttle flap position is changed in accordance with FIG. 6 or 7. In this way, the engine load increases. The combustion torque MIOPT at optimal ignition angle is estimated from engine load and rpm in the characteristic field 720. The deviation of the ignition angle position from an optimal adjustment is determined analog to FIG. 6 in the steps 700 to 714. In the multiplier stage 722, a base combustion torque MIBASE is determined from the estimated optimal combustion torque MIOPT while considering the ignition angle influence without intervention. This base combustion torque defines the torque which is generated by the engine via adjustment of the base ignition angle ZWBASE.

This base combustion torque MIBASE without intervention is compared (divided) in divider element 724 to the pregiven desired torque for determining ignition angle adjustment and/or fuel metering.

If this torque is greater than the desired torque because of increasing engine load, then a fuel intervention and/or an ignition angle correction is computed so that the desired torque is maintained. With this measure, the torque increase because of the change of charge is compensated via cylinder suppression and/or ignition angle correction. What is essential is that the cylinders, which are suppressed during the dynamic operation, are also the cylinders which should be switched off in accordance with the input of the cylinder switchoff. In the simplest example of a bank switchoff, the cylinders on an engine bank are switched off one after the other during the dynamic operation in accordance with a pregiven time sequence. The torque transition during switchoff is realized by the ignition angle correction. If the torque transition is completed, the reduction step REDNEU is the step which is pregiven by the cylinder switchoff. The ignition angle is adjusted to the base ignition angle. These values are retained during the cylinder switchoff. If, in the preferred embodiment, the cylinder switchoff is undertaken during overrun operation (all cylinders switched off), then only an influencing via the charge is undertaken and no correction of the ignition angle. When overrun is resumed, then only the permitted cylinders are switched on.

When switching on, the reduction stage input is set to the value zero, that is, all cylinders are fired. The charge is then less in accordance with the above equation. The throttle flap is adjusted to the new value immediately or with a pregiven ramp. The measured load and therefore the detected combustion torque MIBASE drop. Correspondingly, the ignition angle and/or the number of switched-on cylinders is controlled. With dropping load and therefore with dropping combustion torque, the reduction step REDNEU goes in the direction of zero from the value pregiven by the cylinder switchoff. Here too, the torque is influenced between two reduction stages via ignition angle shift. When the load has oscillated into its steady-state value, the dynamic operation is ended and the reduction stage remains at zero. The ignition angle is again adjusted to the base ignition angle.

In general, the following applies:

MISOLL=MIOPT×(f(ZWOPT−ZWSOL)×(1-REDNEU/REDMX)) wherein: ZWSOL is the ignition angle outputted by the correction.

An a ppropriate ignition angle ZWSOL a nd a n appropriate reduction stage REDNEU results because of the control of the desired torque (shown in FIG. S) in accordance with this equation when maintaining MISOLL. MISOLL remains constant when the accelerator pedal position and rpm remain constant during the operation and no external interventions are present.

As known from the state of the art, the injection intervention and the ignition angle adjustment is used also to realize rapid commands, for example, an ASR command or an MSR command. These provide the desired values which can be adjusted via charge, ignition angle and fuel metering. In this way, these interventions are independent of an operation with or without cylinder switchoff.

According to the state of the art mentioned initially herein, the intervention of ignition angle and injection suppression is so synchronized that the least possible torque jump occurs when there is a change of the reduction step.

FIG. 8 shows an advantageous embodiment of the above-described procedure. As already mentioned, a comparison between desired torque MISOL and combustion torque MIBASE is undertaken in the divider stage 724. The quotient of MISOL and MIBASE is subtracted from one in the comparator stage 726 and the difference is multiplied by the maximum reduction step number REDMX in the multiplier stage 728. Thereupon, the result is inverted in the inverter 730. At the output of the inverter, the value 1/((1-MISOLL/ MIBASE)×REDMX) is present. However, this is in accordance with the above equation, for optimal ignition angle nothing else than the pregiven reduction step REDNEU. For active cylinder shutoff, the switch element 732 is in the position shown. Accordingly, a reduction step REDNEU is outputted which is realized by the charge change pregiven by the interruption of the injections to the pregiven cylinders. Outside of the phases with cylinder shutoff, the switch element 732 is in the other position so that zero is outputted as a reduction step. The desired torque value MISOLL is supplied to a further divider stage 736 via the line 734. This path identifies the determination of the desired ignition angle. The line 738 leads to this divider stage 736. The combustion torque MIND is determined while considering the actual number of shut-off cylinders and is supplied via this line. The combustion torque MIND is determined by the inversion of the above-mentioned formula. The combustion torque MIND is determined from the actual number of suppressed cylinders REDST by division by the maximum step number in block 740 and the subtraction of this quotient from 1 while multiplying with the optimal torque in the multiplier stage 742. The quotient of desired torque and combustion torque is formed in element 736. This quotient is converted into the ignition angle change DZW via a line 744 and the efficiency characteristic line 746. In the corrective position 748, the optimal ignition angle, which is determined in the characteristic field 700, is corrected and is outputted via the line 750 as desired angle ZWSOLL.

Figure 9:
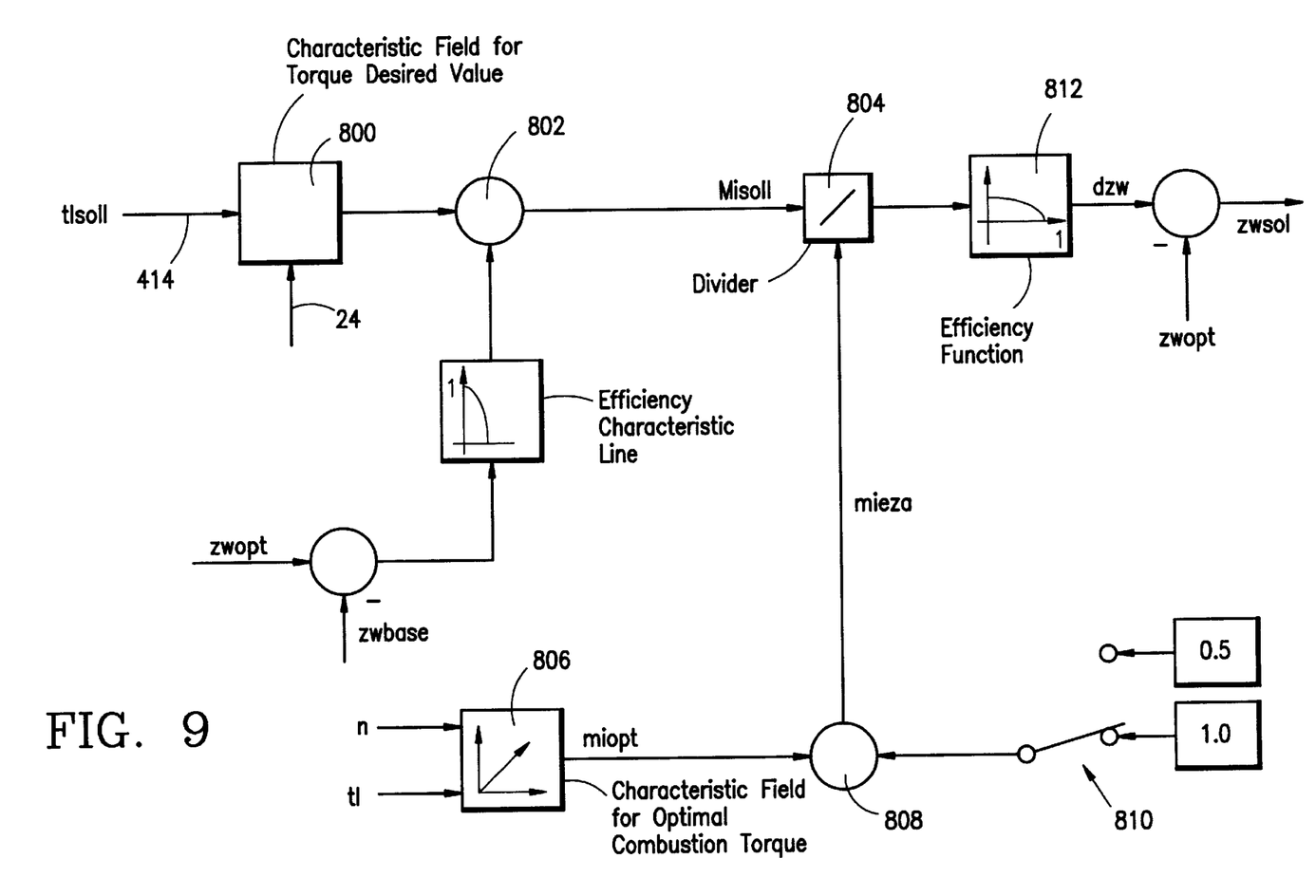

FIG. 9 shows a simplified embodiment relative to the bank shutoff wherein an entire cylinder bank is shut off. In this embodiment, no torque value but a charge desired value is pregiven by the driver. This value is supplied via the line 414. In a characteristic field 800, the charge desired value is converted in accordance with engine rpm into a torque desired value. In a preferred embodiment, the relative charge from the driver is multiplied by the maximum load and the air density and is corrected via a filter which essentially defines the intake pipe dynamic. The combustion torque, which is read out of the characteristic field, is corrected in the multiplier position 802 to the desired combustion torque MISOLL in accordance with the difference of the optimal ignition angle and the basic ignition angle as described in the other embodiment. In the divider position 804, the desired torque MISOLL is divided by the computed torque value MIEZA which defines the combustion torque for optimal ignition angle while considering the number of active cylinders. This combustion torque is formed from the optimal combustion torque, which is determined in characteristic field 806 in a manner known per se. The optimal combustion torque is multiplied in multiplier stage 808 by a factor which gives the number of active cylinders. If all cylinders are active, this factor is one and, for a shutoff of a cylinder bank, this factor is 0.5. The corresponding selection takes place via the switch element 810. An ignition angle corrective value DZW is determined from the quotient of the desired combustion torque and actual combustion torque in accordance with the efficiency function 812. With the subtraction of this corrective value from the optimal ignition angle, the desired ignition angle DZWSOL, which is to be adjusted, is formed.

The ignition angle intervention (rapid intervention) which is described in FIG. 9, is activated with the activation of the cylinder shutoff or with the cylinder switchon in the switched off cylinder (switching of switch element 810). And, after a specific time or depending upon load, the ignition intervention is again blocked when the load has reached steady state and the bank switchover is successfully carried out.

The charge is first increased in accordance with FIG. 6 when there is a switchover from the operation with twelve cylinders to an operation with six cylinders. This charge change is compensated by the ignition angle correction in the context of the normal engine control so that the engine torque remains constant. If the charge has reached steady state, the cylinder shutoff is carried out and the cylinders on one bank are immediately shut off one after the other. In this way, the combustion torque value MIEZA is reduced by half whereby the ignition angle is again advanced for the cylinders which are still fired. When all cylinders are shut off, the ignition angle intervention is ended. With the switchover of the operation from six to twelve cylinders, the switching elements are simultaneously changed in the charge path as well as for the ignition angle correction. The shut off cylinders are immediately again switched on. The engine torque initially is too large because the charge is reduced slowly. For this reason, and in accordance with FIG. 9, the ignition angle is retarded. The ignition angle is further and further advanced with decreasing load. The desired ignition angle from the computation of FIG. 9 is no longer considered when the load reaches steady state and the intervention is ended.

The embodiment of FIG. 9 is not only limited to a charge desired value pregiven by the driver; instead, the embodiment of FIG. 9 can be carried out in the context of FIG. 8 as a simple embodiment.

In the preferred embodiment, and in the case of a bank shutoff, the other cylinder bank is shut off with each shutoff operation.

We claim:

1. A method for controlling an internal combustion engine having an ignition angle and having a given number of cylinders to which an air charge is supplied during operation of the engine, the method comprising the steps of:

providing a desired value (misol) for the torque of said engine;

determining the number of cylinders with which said engine is driven in dependence upon the operating state of said engine;

influencing the number of cylinders, which are active, during a transition from a mode of operation wherein a first number of said cylinders are active into a mode of operation with a second number of said cylinders (redsoll), which are active;

adjusting the air charge on the basis of said desired value (misoll) and said second number of said cylinders (redsoll);

determining the ignition angle (zwsol) in dependence upon the deviation of said desired value (misol) for said torque of said engine from the actual value (mind, mieza) of the torque thereof in the context of a control of said actual value (mind, mieza) to said desired value (misol); and, said actual value (mind, mieza) of said torque taking into consideration the adjusted air charge (miopt) and the actual number of cylinders (redst) which are active.

2. The method of claim 1, wherein the actual number (redneu) of cylinders is determined in accordance with the deviation of said desired value (misoll) from an actual torque (mibase) which considers the present air charge adjustment.

3. The method of claim 1, comprising the further steps of: for a built up air charge, sequentially shutting off the selected cylinders; and, sequentially taking back the ignition angle correction at the fired cylinders.

4. The method of claim 1, wherein said desired value is one of the following pregiven by the driver: a desired torque, a desired air charge, a desired load or a desired power.

5. The method of claim 1, wherein said desired value is determined by interpolation from a maximum value for torque and an idle required value.

6. The method of claim 1, wherein said desired value is determined by interpolation from a maximum value for the air charge and an idle required value for the air charge.

7. The method of claim 1, wherein the air charge desired value is determined from the selection of a driver input and at least one of the following ancillary functions: drive slip control, engine drag control, transmission intervention, idle control and/or by limiting functions for at least one of the following: rpm limiting, road speed limiting, load limiting and torque limiting.

8. The method of claim 1, wherein the torque desired value is determined from the selection of a driver input and at least one of the following ancillary functions: drive slip control, engine drag control, transmission intervention, idle control and/or by limiting functions for at least one of the following: rpm limiting, road speed limiting, load limiting and torque limiting.

9. An arrangement for controlling an internal combustion engine having an ignition angle and having a plurality of cylinders to which an air charge is supplied during operation of the engine, the arrangement comprising:

an electronic control apparatus functioning to:

output a desired value (misoll) for the torque of said engine; and, in dependence upon the operating state of said engine, determine the number of said cylinders with which said engine is driven;

means for influencing the number of said cylinders during a transition from a first operating mode with a first number of said cylinders into a second operating mode with a second number (redsol) of said cylinders;

means for controlling the air charge on the basis of the desired value thereof and said second number (redsol) of said cylinders; and, means for controlling the ignition angle (zwsol) in dependence upon the deviation of said desired value (misol) for said torque from the actual value (Mind, Mieza) of said torque, which considers the adjusted air charge (Miopt) and the active number (redst) of said cylinders in the sense of a control of said actual value to said desired value.

\* \* \* \* \*

UNITED STATES PATENT AND TRADEMARK OFFICE
CERTIFICATE OF CORRECTION

PATENT NO. : 6,098,592  
DATED : August 8, 2000  
INVENTOR(S) : Werner Hess and Hong Zhang Page 1 of 1

It is certified that error appears in the above-identified patent and that said Letters Patent is hereby corrected as shown below:

Title page,
Under "FOREIGN PATENT DOCUMENTS": insert the following
-- 4,211,173    10/1993        Germany
   4,407,475    09/1995        Germany
   2,544,390    10/1984        France --.

Column 1,
Line 32, delete "5,556,178" and substitute -- 5,558,178 -- therefor.
Line 33, delete "5,657,238" and substitute -- 5,657,230 -- therefor.

Column 5,
Lines 55 and 56, delete
"MIDK = MISOLLF
Ü/ (f (ZWOPT - ZWBASE) x (1 - REDSOL/REDMX)"
and substitute
-- MIDK = MISOLLFÜ/ (f (ZWOPT - ZWBASE) x (1 - REDSOL/REDMX) --
therefor.

Column 8,
Line 48, delete "a ppropriate" and substitute -- appropriate -- therefor.
Line 48, delete "a nd" and substitute -- and -- therefor.
Line 48, delete "a n" and substitute -- an -- therefor.
Line 50, delete "FIG. S" and substitute -- FIG. 8 -- therefor.

Signed and Sealed this

Thirteenth Day of November, 2001

*Attest:*

NICHOLAS P. GODICI
*Attesting Officer*    *Acting Director of the United States Patent and Trademark Office*